Sept. 23, 1958 W. W. BUEHLIG 2,853,213
COMBINATION MEASURING AND DIRECT POURING
DISPENSER FOR GRANULAR MATERIALS
Filed Sept. 6, 1955

INVENTOR.
William W. Buehlig
BY
ATTORNEY

United States Patent Office 2,853,213
Patented Sept. 23, 1958

2,853,213

COMBINATION MEASURING AND DIRECT POURING DISPENSER FOR GRANULAR MATERIALS

William W. Buehlig, Kansas City, Mo.

Application September 6, 1955, Serial No. 532,670

2 Claims. (Cl. 222—455)

This invention relates to dispensing devices for use in connection with granular materials and, more particularly, to devices of such type which are adapted for use in either the measured dispensing of such materials or the direct and unimpeded delivery thereof at the option of the user.

Prior devices of the same general class intended for use in comparable applications have all been subject to various disadvantages, notable among which are their undue complexity resulting in high manufacturing costs and a tendency to get out of order when frequently used and their inability to dispense granular materials in accurately measured quantities.

Accordingly, it is the primary object of this invention to provide dispensing apparatus overcoming all of the above mentioned and other disadvantages of such prior devices.

Another important object of this invention is to provide such apparatus which is adapted for easy conversion between a condition for directly delivering granular material in an unimpeded flow and for delivering such material in accurately measured, predetermined quantities.

Another important object of this invention is to provide such apparatus which is of a nature adapted for easy installation upon a container for granular material and for easy removal when it is necessary to clean the apparatus or emplace same upon a different container.

Still other important objects of this invention, including certain significant details of construction, will be made clear or become apparent as the following description of the invention progresses.

Figure 1:
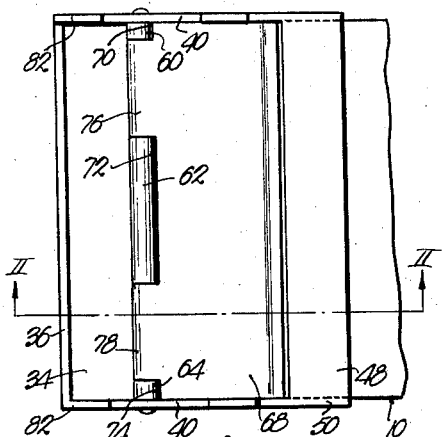
Figure 1 is a top plan view of one embodiment of apparatus made in accordance with this invention showing the same in place upon a container illustrated fragmentarily.
Figure 2:
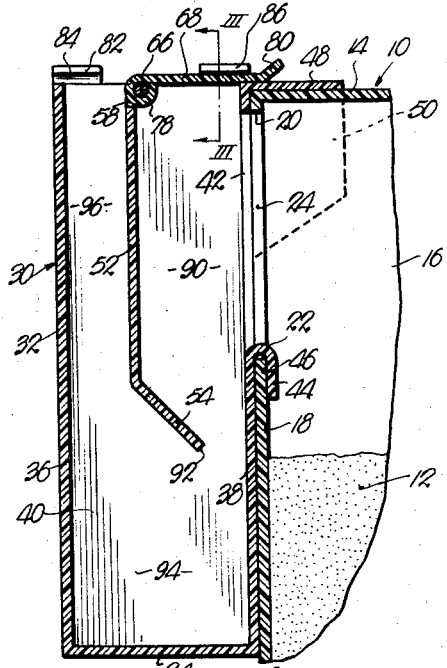
Fig. 2 is a cross-sectional view taken on line II—II of Fig. 1.
Figure 3:
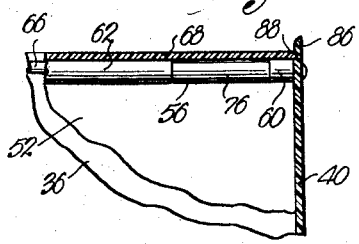
Fig. 3 is a fragmentary cross-sectional view taken on line III—III of Fig. 2.

Referring first to Figs. 1, 2 and 3 the numeral 10 generally designates a container or box such as those of the cardboard type normally used for granular soap and detergent materials, a quantity of such granular material being represented within the box 10 as at 12. Box 10 has a top wall 14, a pair of opposed side walls 16 (only one of which is illustrated in Fig. 2), a bottom wall (not shown) and a pair of opposed end walls 18 (only one of which is illustrated in Fig. 2). One of the end walls 18 is provided with means such as a line of weakness initially formed therein by which a tab or portion of the end wall 18 which is not illustrated may be removed from the wall 18 to present a pouring aperture 20 in wall 18 adjacent the top of box 10. Such aperture 20 preferably has a straight horizontal lowermost edge as at 22 and side edges that terminate in at least slightly spaced relationship to the side walls 16, one of such edges being indicated at 24.

The dispensing apparatus of this invention is broadly designated by the numeral 30 in the embodiment of Figs. 1, 2 and 3 and comprises basically an open topped, boxlike body 32 including a bottom wall 34, an outermost side wall 36, an innermost side wall 38, and a pair of opposed end walls 40. A material passing opening 42 of preferably substantially the same shape and configuration as the aperture 20 of the container 10 with which the apparatus 30 is to be used is formed in the side wall 38 adjacent the normally uppermost extremity thereof. A portion of the end wall 38 adjacent the lowermost extremity of opening 42 is bent outwardly and downwardly upon itself as at 44 to present a channel 46 for receiving therein the portion of wall 18 of container 10 directly underlying aperture 20. A top flange 48 and a pair of opposed side flanges 50 extend laterally from the upper portion of side wall 38 of apparatus 30, the top flange 48 being adapted to directly overlie a portion of top wall 14 of container 10, and the side flanges 50 being adapted to receive the side walls 16 of container 10 therebetween, when the apparatus 30 is emplaced upon the container 10 with the portion of wall 18 of container 10 directly underlying aperture 20 fully inserted within the channel 46 presented by bent back stretch 44 of wall 38 of apparatus 30.

It will thus be clear that the top flange 48 and side flanges 50, in cooperation with the channel 46 presented by stretch 44, are adapted to permit easy emplacement of the apparatus 30 upon the container 10 and to releasably retain the same thereon in positively emplaced relationship.

An upright partition wall 52 is mounted upon and extends between end walls 40 of apparatus 30 from adjacent the top of the latter to a point below the lowermost edge of opening 42, such partition 52 being spaced between side walls 36 and 38 of the apparatus 30. Adjacent its lowermost extremity, partition wall 52 includes a laterally angled portion 54 extending from the plane of the upper portion of partition 52 toward, but not into contact with, the side wall 38 below the normally lowermost extremity of opening 42.

The uppermost extremity of partition 52 is notched as at 56 and 58 to present a number of projecting portions 60, 62 and 64 which are bent downwardly upon themselves around a hinge pin 66. Hingedly interconnected with the uppermost extremity of partition 52 is a door 68 having cut away portions 70, 72 and 74 to accommodate projections 60, 62 and 64 respectively of partition 52 and defining projections 76 and 78 on the door 68 which are bent upon themselves around the hinge pin 66. Door 68 has an upturned, angled portion or flange 80 along the extremity thereof remote from the hinge pin 66 to facilitate operative engagement of a user's finger with the door 68 for swinging the same upon the pin 66 as hereinafter more fully explained.

Extending upwardly from each of end walls 40 of apparatus adjacent the side wall 36 thereof is a resilient extension 82 provided with an inwardly facing elongated notch 84 adapted to engage the lateral edges of door 68 when the latter is swung upon hinge 66 in a direction moving the door 68 to an extreme position overlying wall 36 of apparatus 30. Similarly, an upstanding resilient projection 86 is provided upon each of end walls 40 of apparatus 30 adjacent the uppermost extremity of side wall 38, and each of extensions 86 is provided with an inwardly facing, door receiving notch 88. The engagement between door 68 and notches 84 and 88 is made releasable by virtue of the resiliency of extensions 82 and projections 86. It will be clear that the purpose of the opposed notches 84 and the opposed notches 88 are to releasably retain the door 68 in either of its extreme positions of swinging movement upon the hinge pin 66, one of such positions being with the door 68 closing the opening of apparatus 30 defined by end walls 40, partition 52 and side wall 36, while the other extreme position is with the door 68 engaging the top of a portion of top flange 48 and closing the opening of apparatus 30 defined by the partition 52, the end walls 40 and the side wall 38 thereof.

In operation, it will be clear that with the door 68 swung to a position within the notches 84, the opening in apparatus 30 between partition 52, end walls 40 and side wall 38 thereof will be open, so that, when the container 10 and apparatus 30 thereon are inverted or suitably tipped, material 12 from within container 10 will flow directly and without impediment out through aperture 20 of container or box 10, through opening 42 of apparatus 30 and out the opening provided by the swinging of door 68 to a position within notches 84.

When the user desires to dispense an accurately measured quantity of the material 12, rather than to have the same flow continuously from the apparatus 30, the door is swung to the position illustrated in Fig. 2 in which the lateral edges thereof are received within notches 88 and the opening in apparatus 30 defined by partition 52, end walls 40 and side wall 38 is closed. In this condition, the opening in apparatus 30 defined by side wall 32, end walls 40 and partition 52 will obviously be open. Upon inversion of the container 10 with apparatus 30 thereon, when the door is in the position just mentioned, material 12 will flow through aperture 20 and opening 42 into a measuring chamber 90 defined by the partition 52, the end walls 40 and the portion of side wall 38 normally directly underlying the lowermost extremity of opening 42. Such material 12 will continue to flow into measuring chamber 90 until a level is reached equal with the then uppermost extremity 92 of inclined portion 54 of partition wall 52. When the material 12 has reached such level a lock will be created by the convergence of portion 54 of partition 52 and wall 38 which will stop the flow of material 12 from the container 10 into chamber 90. Thereupon, the container 10 and apparatus 30 thereon will be tilted back to their normally upright condition whereupon the material 12 measured into chamber 90 will be delivered through the passage between extremity 92 of partition 52 and wall 38 into a storage or "awaiting delivery" chamber 94. Upon again tilting the container 10 and apparatus 30 in a counterclockwise direction from that illustrated in Fig. 2, the measured quantity of material stored in chamber 94 will be delivered out through a passage 96 between side wall 36, end walls 40 and partition 52 and, at the same time, another predetermined quantity of material 12 will be accurately measured out into the measuring chamber 90 for delivery to the storage chamber 94 when the container 10 and apparatus 30 are again returned to their normally upright condition. Accordingly, it will be understood that with this mode of operation the apparatus 30 simultaneously delivers one measured quantity of material 12 and measures out another such quantity each time the container 10 and apparatus 30 are tipped to an inverted condition.

The flange portion 80 on door 68 enables the user to conveniently and quickly disengage the door 68 from either of the pairs of grooves 84 or 86 in one pair of which it is normally frictionally held.

Figure 4:
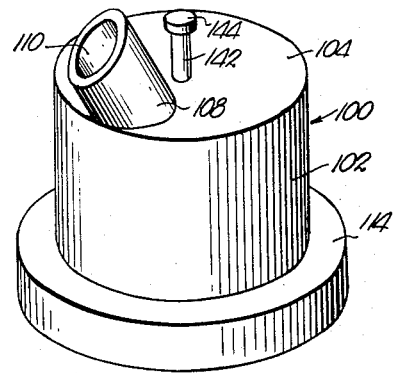
Fig. 4 is a perspective view of a modified form of apparatus made in accordance with this invention.
Figure 5:
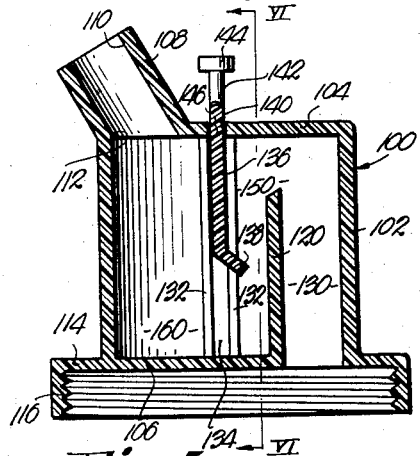
Fig. 5 is a central cross-sectional view of the apparatus shown in Fig. 4.
Figure 6:
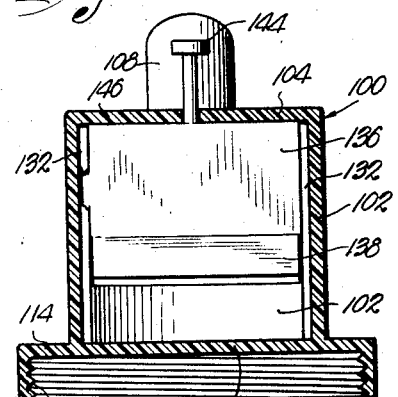
Fig. 6 is a cross-sectional view taken on line VI—VI of Fig. 5.

Referring now to Figs. 4, 5 and 6, there is illustrated a modified form of the invention wherein the dispensing apparatus is generally indicated by the numeral 100. Apparatus 100 includes a cylindrical body 102 having a top wall 104 and a bottom wall 106. A pouring spout 108 of frusto-cylindrical, tubular form extends upwardly and outwardly at an angle from the top wall 104 of body 102, the bore 110 of spout 108 being in communication with an aperture 112 in top wall 104.

Body 102 is mounted upon a screw cap 114 having internal threads adapted to fit upon the external threads of a container (not shown) for granular material such as the glass jars conventionally used in restaurants for the dispensing of sugar.

A portion of bottom wall 106 is cut away as at 118 to present an opening into the interior of body 102 through the cap 114. An inner wall 120 extends upwardly from bottom wall 106 immediately adjacent the opening 118 to a point spaced below the top wall 104. Wall 120 extends transversely across the body 102, thus defining an inlet passage 130 in communication through the opening 118 with a container (not shown) upon which the cap 114 is screwed.

The interior of the side wall of body 102 is provided with opposed pairs of upright rail projections 132, each pair of rail projections 132 being in spaced parallelism defining a track groove 134 therebetween.

Extending across the interior of body 102 and slidably mounted within track grooves 134 is a shiftable partition 136 of substantially rectangular shape and normally upright disposition having a laterally angled flange portion 138 extending therefrom toward, but not into engagement with, the inner wall 120. The lateral margins of partition 136 are frictionally engaged by the opposed pairs of rail projections 132 sufficiently to maintain the partition 136 in any position to which same may be shifted.

Secured to the upper extremity of partition 136 and extending upwardly therefrom through an opening 140 in top wall 104 is a cylindrical rod 142 having an operating knob 144 thereon above the top wall 104.

Although the operation of this modified form of the invention should be obvious to those skilled in the art from the explanation of operation heretofore given in connection with the previously described embodiment of the invention, it may be noted that when the cap 114 is screwed upon an open top container (not shown) containing granular material, and when the partition 136 is in the position illustrated in Fig. 5, tipping of the container and apparatus 100 thereon in a counterclockwise direction from that illustrated in Fig. 5 will cause granular material to pass through opening 118 and passage 130 into a measuring chamber 150 until the material has filled such chamber to a point adjacent the normally lowermost extremity of angled portion 138 of partition 136. Upon tilting the apparatus 100 back to its normal or upright condition, the granular material theretofore measured into measuring chamber 150 will be delivered by gravity into a dispensing chamber 160 defined by the side wall of body 102, the inner wall 120 and the bottom wall 106. When the apparatus 100 is again tipped to an inverted condition, the measured quantity of material within chamber 160 will be delivered through bore 110 of spout 108, while another quantity of material is being measured into measuring chamber 150.

When it is desired that the apparatus 100 be used in a condition giving direct and unimpeded flow of granular material from the container to which apparatus 100 is attached out through spout 108, the operating knob 144 is moved toward top wall 104, thereby moving the uppermost edge 146 of partition 136 downwardly to a position spaced below the top wall 104. Granular material may then freely pass from the passage 130 between edge 146 of partition 136 and top wall 104 and thence outwardly through bore 110 of spout 108.

It may be noted that, although the apparatuses 30 and 100 may be formed of metal or any other suitable material, the material preferred to be used is plastic, which may be molded or otherwise formed by techniques well known to the plastics manufacturing art in a manner rendering many parts of the apparatuses 30 and 100 integral or unitary, as illustrated in the drawing.

It will now be perceived that this invention is ideally suited for the accomplishment of the objectives hereinbefore set forth. It will be manifest to those skilled in the art, however, that the exact details of construction of the two embodiments chosen for purposes of illustration may be modified or changed in certain respects without departing from the true spirit or intention of this invention. Accordingly, it is to be understood that this invention shall be deemed limited only by the scope of the appended claims.

Having thus described the invention what is claimed as new and desired to be secured by Letters Patent is:

1. In a measuring dispenser for granular material packaged in a container having a delivery opening, a hollow body having structure presenting a compartment therein provided with a first outlet at the top and one side thereof, a second outlet at the top and the opposite side thereof and an inlet at the opposite side and adjacent the top thereof, said inlet being in direct communication with said second outlet; a substantially vertical partition mounted within the body intermediate said sides of the compartment and extending downwardly from the top of the compartment to a position below the lowermost extremity of said inlet; a lateral flange on the lowermost extremity of the partition extending at an angle downwardly and toward said opposite side of the compartment, said partition and flange dividing the compartment into a measuring chamber communicating with the inlet on one side of the partition, a delivery passage communicating with the outlet on the opposite side of the partition and a storage chamber below the partition and flange and in communication with both the measuring chamber and the delivery passage; a shiftable closure mounted on the body for movement between alternate positions in which it respectively closes said first-mentioned outlet and said second outlet; and means adapted for mounting the body on said container with said inlet in communication with said opening.

2. In a dispenser as set forth in claim 1, wherein said closure is swingably mounted on the body, and said body is provided with means for releasably holding the closure in either of its alternate positions.

References Cited in the file of this patent

UNITED STATES PATENTS

| | | |
|---|---|---|
| 1,648,785 | Savage | Nov. 8, 1927 |
| 1,957,326 | Day | May 1, 1934 |
| 1,962,562 | Hemman | June 12, 1934 |
| 2,584,130 | Huebl et al. | Feb. 5, 1952 |